Feb. 4, 1941.  A. H. ALDERFER  2,230,635
TRUCK BODY
Filed Sept. 1, 1938   2 Sheets-Sheet 1
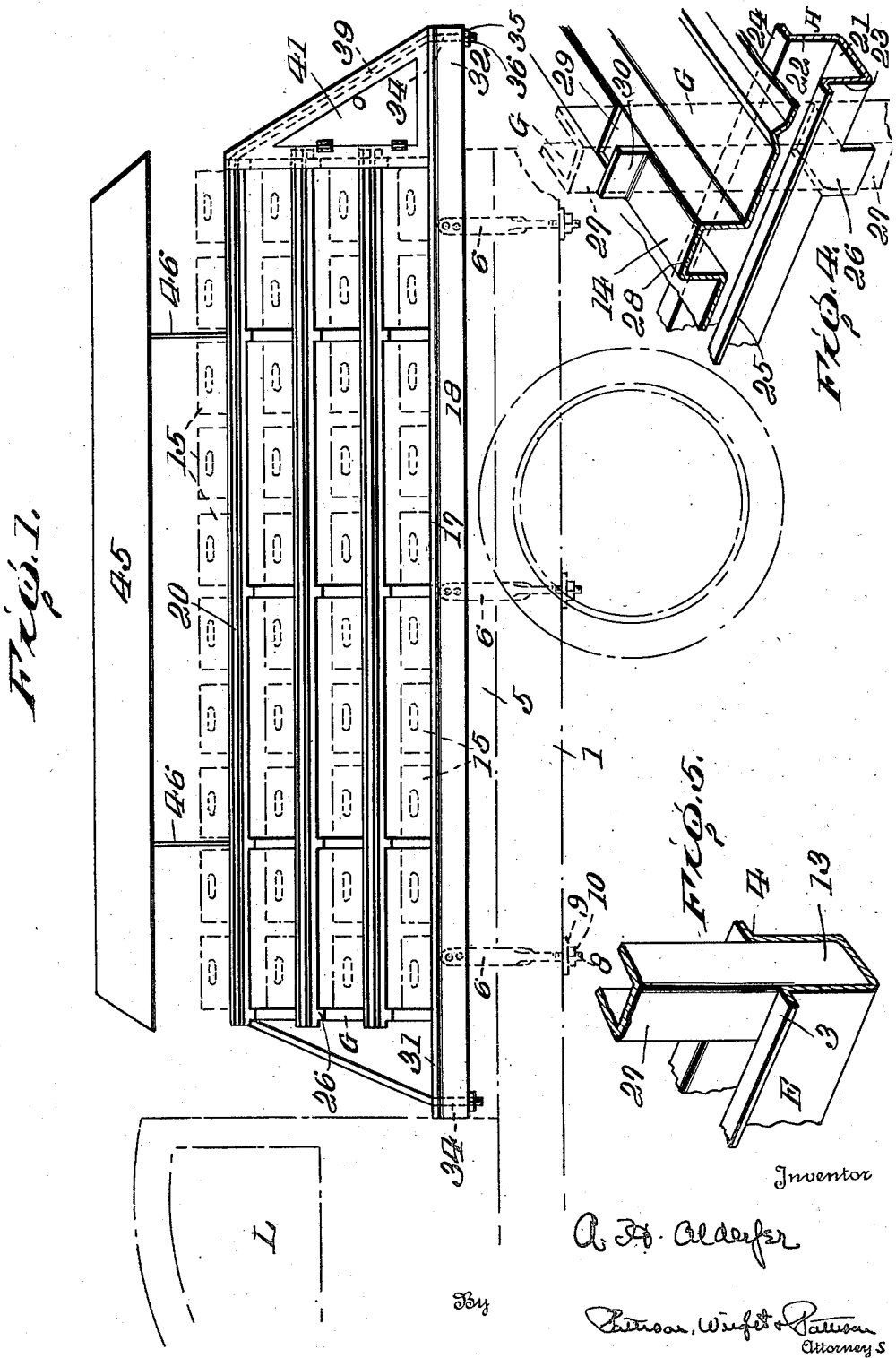

Feb. 4, 1941. A. H. ALDERFER 2,230,635
TRUCK BODY
Filed Sept. 1, 1938 2 Sheets-Sheet 2
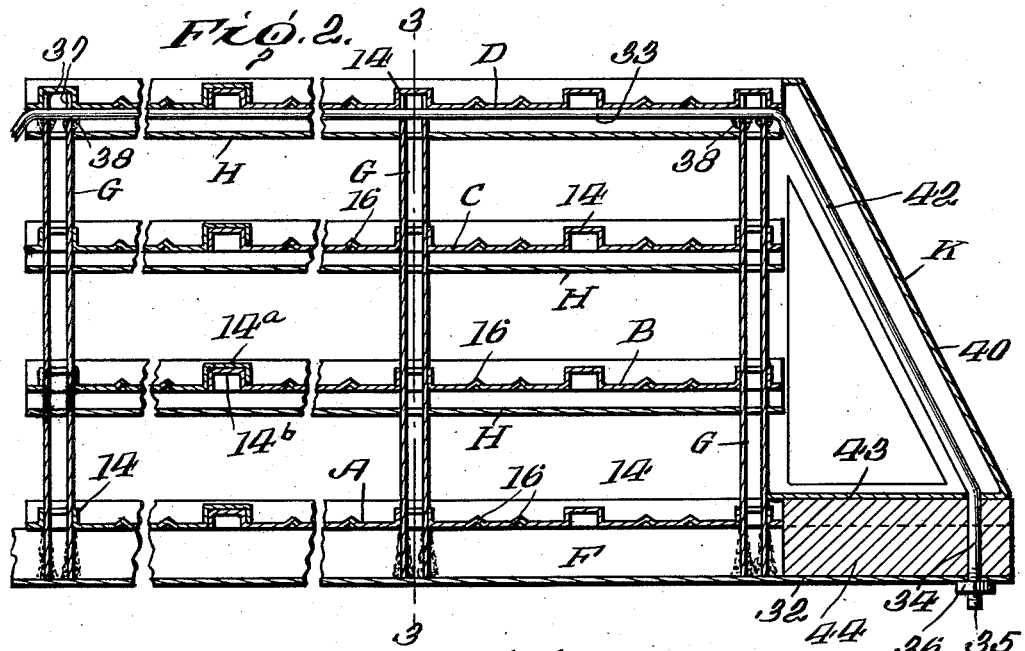
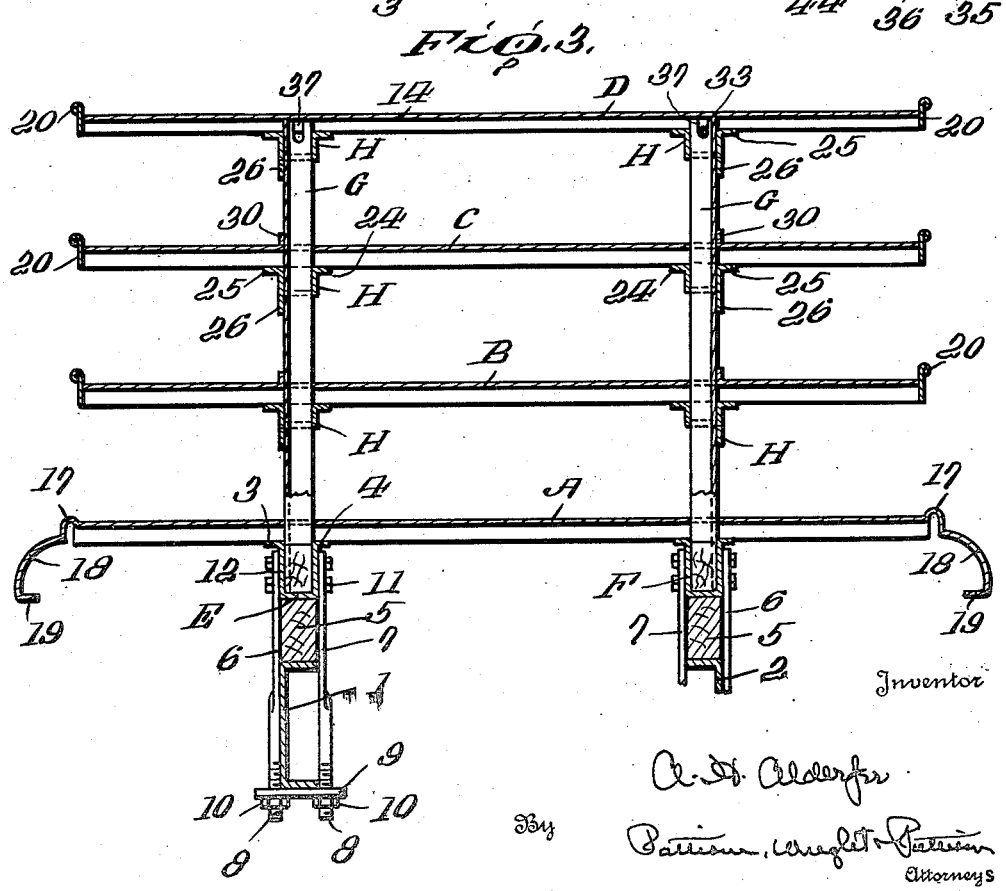
Inventor
A. H. Alderfer
By
Pattison, Wright & Pattison
Attorneys Patented Feb. 4, 1941

2,230,635

UNITED STATES PATENT OFFICE 2,230,635

TRUCK BODY

Alvin H. Alderfer, Philadelphia, Pa.

Application September 1, 1938, Serial No. 228,054

16 Claims. (Cl. 296—3)

The present invention relates to an improved truck body and pertains more particularly and specifically to a metallic truck body which has been designed for use in the delivery and handling of crated, cased or boxed bottled goods, and the invention has as its primary object the provision of a truck body which is much lighter than those now in common use yet is sufficiently strong and durable to carry loads equally as great as those carried by the present used heavier body structures.

By the provision of a truck body of lighter weight a saving is obtained not only in the fabrication of the body but a great saving is also obtained by the user of the truck as maintenance operation and upkeep of a lighter body is materially less than in respect to the heavier bodies commonly in use.

Another object of the invention is the provision of a multi-deck truck body in which the deck structure itself is of novel and improved construction and in which the decks are supported in an improved and novel manner.

Another and still further object of the invention is the provision of a vastly improved and novel manner of bracing the body and particularly the decks and supporting structure thereof to provide for the stresses and strains imparted to said structure due to the inertia of the load when the vehicle upon which the body is mounted is stopped and started.

A multi-deck truck body for the handling and delivery of crated, boxed or cased bottle goods is not original with me as such bodies have been in common usage for a considerable period of time and patents directed to such bodies have been issued. The present invention constitutes an improvement upon such bodies as now are in use and have been patented and the numerous novel constructional features as well as the particular improvements and advantages of my body will be apparent to those familiar with and skilled in this art and will appear in more detail from the following description when read in the light of the accompanying drawings.

In the drawings:

Fig. 1 is a view in side elevation of a delivery truck to which has been applied the present improved truck body.

Fig. 2 is a longitudinal vertical sectional view through the improved body.

Fig. 3 is a transverse sectional view taken on the line 3—3 of Fig. 2.

Fig. 4 is an enlarged detail strung-out perspective view illustrating the structure of the vertical and horizontal deck supporting beams and the construction of the sheet metal deck itself.

Fig. 5 is an enlarged detail perspective view illustrating the engagement of the lower end of one of the vertical supporting standards or beams with one of the lowermost horizontal supporting beams.

The present improved truck body is of metallic construction and to the end of accomplishing the primary object of the invention which is the provision of a truck body which is light in weight, the parts making up the body are formed from light sheets of steel such as are manufactured and sold by the United States Steel Company under the name of "Cor-ten" and the Youngstown Sheet & Tube Company under the name "Yolo." It is to be understood of course that sheet steel manufactured by companies other than those named can be utilized with equally good results.

Inasmuch as the "pay load" carried by the truck is the bottled goods loaded thereon it will be at once obvious that by keeping the weight of the body to a minimum the "pay load" is increased.

Describing the invention in detail and having reference to the accompanying drawings in which a preferred embodiment of the invention is illustrated and using similar reference numerals to designate like parts throughout the following description, A, B, C and D designate the several decks or floors of the truck and as will be readily apparent in the drawings these are arranged in separated parallel relationship and extend substantially from one end of the truck body to the other and from one side of the truck body to the other.

Having reference now particularly to Fig. 3 of the drawings 1 and 2 designate the conventional longitudinally extending stringers or beams which have suitable supporting connection with the vehicle and upon which truck bodies are conventionally mounted. The longitudinal stringers or beams constituting the basic support for the present improved body are designated at E and F and are of a U shape in transverse section with the vertical legs of the U's bent downwardly and outwardly to provide longitudinally extending horizontal legs or flanges 3 and 4 at each side of the upper end of these beams. These longitudinally extending metallic body supporting beams E and F are disposed above the beforementioned main stringers 1 and 2 and rest upon wooden stringers 5 which are disposed upon and extend throughout the length of the tops of the beforementioned stringers or beams 1 and 2.

At a series of separated points throughout the length of the stringers E and F they are secured upon the longitudinally extending wooden beams 5 and to the main truck or vehicle stringers 1 and 2 by suitable clamps made up of the two pieces 6 and 7 the lower ends of which are threaded as at 8 and are joined together by a cross plate 9 which is clamped up against the under side of the main stringers by suitable bolts 10. Bolts 11 pass through the upper ends of the clamp pieces 6 and 7 and wherever one of these clamps occurs a wooden block 12 is inserted in the channelway of the stringers E and F and said bolts 11 pass not only through the side walls of the longitudinal stringers E and F but also through the aforementioned wooden blocks 12. Thus it will be seen that the main supporting beams or stringers E and F of the improved truck body are rigidly and securely clamped to the vehicle.

The several goods carrying and supporting decks A, B, C and D are secured to and supported upon a series of vertically disposed uprights or standards designated as an entirety by G. These uprights or standards are arranged in separated strung-out relation along the stringers E and F and each of them is of a U shape in cross section as is readily apparent by reference to Fig. 5 of the drawings. All these standards are made of the proper dimensions so that their lower ends 13 will fit comparatively snugly within the channelways of the stringers E and F and are suitably secured therein preferably by welding all the engaging portions of the upright and channel members. It is to be understood however that uniting these members by welding operation is optional and that they could be secured in some other suitable manner if it were found desirable. By arranging and disposing the uprights or standards G in the manner described the present improved body has fewer standards than ordinarily found in bodies designed for the use to which the present body is put and that as a consequence the weight of the body is materially reduced. The arrangement of the uprights or standards is such that they pass through and have supporting connection with the body decks at a point well within the outer edges of the decks. Ordinarily truck bodies of this type have standards supporting the outer side edges of their decks. In the present body the decks constitute or have a very considerable overhang beyond their supporting uprights but I have found that my decks are sufficiently strong and rigid to permit of carrying and satisfactorily supporting a load on this overhang.

The lowermost deck A, like all of the decks of the body, is of sheet steel. Inasmuch as it would be more expensive to obtain in a single sheet a piece large enough to constitute the entire deck, the deck is made up of one or more pieces which are joined together in a manner which will be immediately hereinafter described. Having reference to Fig. 2 of the drawings it will be seen that periodically throughout its length the deck is bent or formed upwardly to provide a series of transversely and upwardly extending beam-like members 14. These beams are positioned in respect to one another so as to provide between them a space or distance approximately equivalent to the width of the cases, crates or boxes 15 in which the bottled goods is carried. The beams consequently form a series of transversely extending passageways or aisles for the reception of the cases or crates and will prevent said cases or crates from moving longitudinally of the body when the vehicle is stopped or started. This will prevent jamming of the cases or crates which would be highly undesirable as it would then be difficult to remove the cases from the body when delivery is being made.

These beams 14 in addition to serving the purpose described greatly strengthen the plates constituting the body decks. The body deck plates are further strengthened by being provided intermediate the beams 14 with a series of transversely extending corrugations 16 arranged in separated parallel relation. These corrugations 16 are portions of the plate bent sharply upwardly so that they are substantially of a triangular or V shape in cross section. The bottoms of the crates rest upon these corrugations with the result that there is a very limited and reduced frictional contact between the crates or cases and the decks which make it comparatively easy to slide the crates on the decks for insertion or removal from the truck body.

To prevent any possibility of lateral displacement of the cases from the decks of the body each of the decks is provided with an upstanding side edge. In respect to the lowermost deck A this is bent upwardly as at 17 at its side edges which will prevent any possibility of the crates sliding outwardly and off of the deck. Additionally the deck beyond its upwardly bent portion 17 is curved downwardly and outwardly as at 18 and then inwardly as at 19. By forming the lowermost deck in this manner a smooth finish which adds to the attractive appearance of the body and additionally serves as a means of preventing the road dirt from being thrown upwardly and outwardly by the revolving wheels of the vehicle is provided.

In respect to the remaining intermediate decks B and C and the top deck D of the body an additional strip 20 is provided at each of their side edges to guard against accidental displacement of the cases or crates from these decks.

The lowermost deck A is supported directly upon the flanges 3 and 4 of the bottom longitudinal stringers E and F as is clearly apparent by reference to Fig. 3 of the drawings. At the point of engagement of the deck A with these flanges they will be suitably secured together as for instance by spot welding or any other convenient means.

The intermediate and top decks of the body are supported upon supplemental longitudinally extending stringers or girders designated as an entirety by H. All of these supplemental stringers or girders are of identical construction and description of one will suffice to describe them all. Their particular construction and means of support is best illustrated in Figs. 3 and 4 of the drawings from which it will be seen that similarly to the aforementioned base or main stringers E and F these stringers H are of a U shape in cross section so that they have a channelway made up of a bottom 21 and side walls 22 and 23. The open end of the channelway faces upwardly and the side walls thereof are bent downwardly and outwardly to provide longitudinally extending flanges 24 and 25. These girders H are supported upon the vertical standards G which pass through them. To provide passageway of the vertical standards the bottoms 21 of the girder channelways are provided with an opening of the proper shape to receive and permit the passage therethrough of the standards. This passageway or opening is formed by cutting out the bottom 21 of the girders on three sides and then bending down the cut-out portion to form a downwardly extending tab or ear 26 which parallels the back 27 of the vertical standards. With the girders H properly positioned on the standards they are securely fastened thereto by welding the tab or ear 26 to the rear wall 27 of the standards and by welding those parts of the standards within the trough portion of the girders to the girders. Welding would therefore be utilized on all the engaging parts of the horizontal girders H and vertical standards G. It is to be understood however that means other than welding, such as bolts or the like, could be utilized to secure the girders H to the standards G should it be found desirable.

It has been mentioned that the body decks would probably and preferably be made up of a series of sheets joined together. By reference to Fig. 2 of the drawings it will be seen that I have illustrated as the most desirable manner of interconnecting the several sheets making up a deck, overlapping them at the point where the cross beams 14 occur. To make this point understandable the overlapped and joined edges of the sheets are designated in Fig. 2 of the drawings as 14a and 14b. These overlapped portions of the sheets would preferably be welded together although it would be obvious that other well known connecting means could be used if found desirable.

The intermediate and top deck are in each instance supported upon the longitudinally extending flanges 24 and 25 of the supplemental girders or stringers H as will be readily apparent from Figs. 3 and 4 of the drawings. At the point of engagement of the decks with the flanges they will preferably be rigidly secured together by welding or by any other well known and desirable securing means. The vertical standards G in addition to passing through the horizontal girders H also pass through the decks and to provide for their passage, which in each case incidentally is through the top 28 of the deck cross beams 14, these cross beams are provided with an opening 29. This opening is formed, as has been explained in respect to the openings in the girders H, so that the cut-out portion of the beam can be bent upwardly to provide a tab or ear 30 which parallels and is suitably secured, as by welding, to the rear wall 27 of the vertical standards G. In addition to securing the ears 30 of the decks to the vertical standards those portions of the standards which are in and engage the walls of the beams 14 of the deck can also be suitably secured together as by welding or otherwise.

It is to be noted that the vertical standards G terminate in the cross beams 14 of the uppermost or top deck D as it has been found desirable not to extend them upwardly through and beyond this deck.

When a truck body is loaded it is subjected to stresses and strains which are very considerable in amount and are caused mainly by the inertia of the load when the vehicle is stopped and started. My improved manner of bracing the body to provide for these stresses and strains will now be described. The main supporting longitudinal girders E and F extend forwardly and rearwardly beyond the front and rear ends of the body decks as indicated at 31 and 32 in Figs. 1 and 2 of the drawings. Two steel rods or ties 33 extend from the rearmost ends 32 of the stringers E and F upwardly to and through the upper ends of the vertical standards G and downwardly to the front ends 31 of the members E and F. The ends 34 of these rods pass through and beyond the stringers E and F and have a threaded end 35 carrying a nut 36. By reference to Fig. 3 of the drawings it will be seen that the upper ends of the vertical standards G are notched out as at 37 for the reception and passageway of the tie rods 33. At the point of passage of the tie rods through the two rearmost and two front vertical standards they are welded to these standards as indicated at 38 in Fig. 2 of the drawings. By the construction described it will be seen that by tightening upon the nuts 36 the vertical standards can be braced and in bracing them that the entire truck body is braced. Although I have not so shown it, it is to be understood that it might be found desirable to also weld these tie rods to and in the upper ends of all of the vertical standards rather than only to the front and rear standards.

These tie rods provide not only a means for originally bracing the body structure but it will also be apparent that they provide a means whereby the body structure can be tightened up and rebraced in the event this should be needed at any time after the body has been put into use.

For the dual purposes of providing a storage space, adding to the pleasing appearance of the body and providing a surface to which advertising or reading matter can be applied a cover designated as an entirety by K is positioned on the rear of the body beyond the rear ends of the decks. This cover comprises side walls 39 and a rear wall 40. In the side walls entry doors 41 are provided. The rear wall slants forwardly and upwardly as indicated and thus follows the inclination of the downwardly extending rear end portion 42 of the tie rods 33 and serves as a means for housing and concealing them. The inclination of the rear wall also adds to the appearance of the body. The rear wall provides a space to which can be applied advertising or reading matter as does also as a matter of fact the side walls of the cover. To provide a support for the bottom 43 of the storage space which is made by the cover K the extending rear ends 32 of the stringers E and F carry a wood block 44. This wood block is also of assistance in adding to the holding ability of the tie rods 33.

As is customary in connection with bodies of this kind I provide a vertically disposed and longitudinally extending signboard 45 which is suitably supported from the upper deck of the body by brackets 46.

Although it is not so illustrated it is to be understood that should it be desired a storage space similar to that described as being disposed at the rear end of the truck beyond the rear ends of the deck could also be disposed at the front end of the body beyond the front end of the decks in the space between them and the vehicle cab L. The particular shape of the storage space which could be placed at the front end of the body and the storage space at the rear end of the body is limited only by the desires and demands of the builder or purchaser of the body.

From the foregoing description it will be seen that I have provided a multi-deck truck body designed for the particular purposes described in which there are a very limited number of vertical supports or standards as compared with trucks as now made and used and that there are no transverse supporting girders or stringers utilized in the construction. By reason of these facts the weight of the truck body is materially reduced over bodies as now known and used.

Throughout the drawings the parts making up the body are illustrated as being connected together by being welded but it is to be understood that should it be found more desirable the connection between the parts can be made by bolts, screws or any other suitable like connecting means.

I claim:

1. A side loading truck body, comprising a base, a plurality of longitudinal rows of standards extending upwardly from said base, a plurality of decks supported by said standards in separated relationships, a tie rod for each longitudinal row of standards, each of said tie rods having its front end secured to an anchorage at a point in front of the first standard of one of said rows and extending upwardly and rearwardly and being secured to said standard and then passing through the remaining standards of said row and being secured to the rearmost standard of the row, said tie rods extending downwardly and rearwardly from the said rearmost standard and secured to an anchorage, and means associated with the ends of said tie rods for tightening and putting a tension upon the same, for the purpose described.

2. A side loading truck body, comprising a base composed of a pair of longitudinally extending stringers or girders, a bottom deck supported upon said girders, a row of standards extending upwardly from each of said girders, a plurality of pairs of supplemental longitudinally extending girders above and in vertical alignment with said first mentioned girders and secured to said standards, intermediate and upper decks supported in separated spaced parallel relation upon said supplemental girders and secured thereto and tie members extending from the front end of said base and over and through the upper ends of said standards and downwardly to the lower end of said base for bracing said body structure.

3. In a side loading truck body, a base, a plurality of standards extending vertically therefrom, load carrying means in the form of a plurality of decks supported upon said standards, and brace means anchored to said base at points forward and rearward of said standards and of said deck ends and engaging all of said standards adjacent their upper ends for bracing said body against the stresses and strains imparted thereto by the load carried on said decks.

4. A truck body, comprising a bottom, intermediate and top decks, a pair of longitudinally extending stringers disposed beneath said bottom deck, said stringers being of a U shape and provided with longitudinally extending flanges engaging the under side of said bottom deck and secured thereto, a line of standards extending vertically from each of said stringers and having their lower ends secured within the channels of said stringers, said standards passing through said bottom and intermediate decks and terminating at the under side of said upper deck, each of said decks provided with passageways for each of said standards, said passageways formed by cutting out three sides of an opening and bending the deck material upwardly to form an ear, said ears of said decks being secured to said standards, a plurality of pairs of supplemental longitudinally extending girders for supporting said intermediate and upper decks, said supplemental girders being of a U shape in cross section and having longitudinally extending flanges which engage the under sides of said decks and are secured thereto, said supplemental girders provided with passageways for the reception of said standards, said passageways being formed by cutting out three sides of an opening and bending the girder material downwardly to provide ears, and said ears being suitably secured to said standards.

5. A construction such as defined in claim 4, wherein said girders and standards constitute the entire supporting means for said decks and are disposed well inside of the longitudinal side edges of said decks to provide overhanging deck portions at each side of said vertical standards.

6. A construction such as defined in claim 4, wherein tie rods are secured to said stringers at a point forward of said deck and extend through the upper ends of said standards and are secured to the rear ends of said stringers at a point beyond the rear ends of said deck, said stringers being rigidly secured to the foremost and rearmost vertical standards, and means adjustably clamping the ends of said tie rods to said stringers whereby an adjustable bracing tension for the vertical standards and truck body structure is provided.

7. In combination, a vehicle having longitudinally extending girders and a truck body supported thereon, said truck body comprising a plurality of superposed sheet metal decks arranged in separated relationship, vertically and horizontally disposed means supporting said decks, all of said deck supporting means being disposed in planes immediately above one or the other of said vehicle girders, and said decks extending a substantial distance outwardly beyond the sides of said supporting means and said vehicle girders to provide overhanging portions having sufficient rigidity to support a deck load and access to which for loading purposes can be obtained without interference from said deck supporting means.

8. A construction such as defined in claim 7, wherein longitudinally extending tie rods having engagement with said vertical deck supports adjacent the upper ends thereof and engagement with and anchorage at points forwardly and rearwardly of the foremost and rearmost vertical standards is provided, and said tie rods constructed to provide means for exerting an adjustable bracing tension upon said truck body structure.

9. A side loading multi-deck truck body having no deck supporting means at the corners or longitudinal edges of said decks, comprising a plurality of horizontally disposed decks arranged in spaced parallel superposed relationship, a pair of longitudinally extending spaced parallel girders beneath the lowermost deck and disposed in planes approximately intermediate the center line and the outer longitudinal edges of said decks, a row of standards extending upwardly from each girder and passing through and having supporting connection with a plurality of said decks, a longitudinally extending brace passing through each of said rows of standards at a point above at least two of said decks and wholly above the loads adapted to be carried thereby and said braces having their front and rear ends secured to said girders at points forward and rearward respective of the front and rear ends of said decks.

10. In a truck body, a plurality of sheet metal decks arranged in superposed relationship provided at spaced intervals with upwardly bent transversely extending beam-like portions, a plurality of longitudinally extending deck supporting girders, said deck beams and girders at their crossing points provided with aligned openings, a vertical standard passing through each of said openings, said beams and girders provided with a tab at one side of their openings, and said tabs being secured to said vertical standards.

11. A construction such as defined in claim 10, wherein the deck beams and the longitudinal girders are of a U-shape in cross section, said vertical standards also being of a U-shape in cross section and of a dimension whereby their side walls abut the side walls of the deck beams and the side walls of said girders, and the abutting and engaging side walls of said members being secured together.

12. A side loading multi-deck truck body having no deck supporting means at the corners or longitudinal edges of said decks, comprising a plurality of horizontally disposed decks arranged in spaced parallel superposed relationship, a pair of longitudinally extending spaced parallel main girders beneath the lowermost deck and disposed in planes approximately intermediate the center line and the outer longitudinal edges of said decks, a row of standards extending upwardly from each girder and passing through and having supporting connection with a plurality of said decks, longitudinally extending secondary girders carried by said standards and disposed beneath and in supporting relationship to said intermediate and upper decks, a longitudinally extending brace passing through each of said rows of standards at a point above at least two of said decks and wholly above the loads adapted to be carried thereby, that portion of each longitudinally extending brace which is above a deck being disposed within one of said hollow girders and said braces having their front and rear ends secured to said main girders at points forward and rearward respective of the front and rear ends of said decks.

13. A side loading multi-deck truck body characterized by having no supporting means at the corners or longitudinal edges of said decks, comprising a plurality of horizontally disposed decks arranged in spaced parallel superposed relationship, a pair of U shaped longitudinally extending spaced parallel girders disposed beneath the lower-most deck in positions whereby said deck overhangs said girders to a considerable extent at each side thereof, a row of vertically disposed standards extending upwardly from each girder and having their lower ends passing through the lower-most deck, and into said U shaped girders and being secured therein, the upper ends of said rows of standards passing through suitable openings in the remaining decks and having supporting connection with said decks, and the sole brace for said standards and the deck supported thereby comprising a pair of tie rods one each being provided for a row of standards, each of said tie rods being secured at a point in front of the foremost standard in a row and extending up to and extending through each of the standards in the row and onwardly or beyond the rear-most standard and being anchored at a point rearward of said rearmost standard and those parts of said tie-rods which are above a deck being disposed closely adjacent and paralleling the under side of the next adjacent upper deck.

14. In a truck body, a plurality of sheet metal decks arranged in superposed relationship provided at spaced intervals with upwardly bent transversely extending beam-like portions, a plurality of longitudinal deck supporting beams, said beams at their crossing points provided with aligned openings, a pair of body girders arranged in spaced parallel relationship and extending longitudinally under the lowermost deck and being disposed in planes well within the planes of the longitudinal edges of said decks so that said decks extend well beyond said girders at either side thereof, a row of standards extending vertically from each girder and having their lower ends secured thereto, each standard of each row passing through a pair of the aforesaid aligned openings at the crossing points of said beams, said beams at one side of their openings provided with a tab, said tabs being secured to said vertical standards, and said vertical standards constituting the sole supporting means for said superposed decks.

15. A construction such as defined in claim 14, wherein a tie rod is provided for each longitudinal row of standards, each of said rods having its front end secured to an anchorage at a point in front of the first standard of one of said rows and extending through each of the standards of a row and passing rearwardly through the rearmost standard of the row and being secured at a point rearward of said last standard, and said rods constituting the entire and sole bracing means for said standards.

16. In a truck body, a plurality of sheet metal decks arranged in superposed relationship provided with two parallel lines of openings, which lines extend longitudinally of the decks, a deck supporting girder extending under each line of openings and each girder provided with openings aligned with said deck openings, a vertical standard extending through each pair of aligned openings, and means adjacent said openings adapted to be secured to said uprights.

ALVIN H. ALDERFER.